United States Patent [19]

Ocampo et al.

[11] Patent Number: 5,108,836
[45] Date of Patent: Apr. 28, 1992

[54] WEATHERABLE PROTECTIVE SURFACING FILM

[75] Inventors: Don O. Ocampo; Emery A. Palmer, both of Charlotte, N.C.

[73] Assignee: Rexham Industries Corp., New York, N.Y.

[21] Appl. No.: 354,814

[22] Filed: May 22, 1989

[51] Int. Cl.⁵ .................. B32B 27/00; B32B 27/08; B29D 7/00; C09J 5/00

[52] U.S. Cl. .................. 428/335; 428/354; 428/421; 428/422; 428/518; 428/520; 428/252; 428/463; 428/483; 428/352; 264/212; 156/242; 156/306.3

[58] Field of Search .............. 428/421, 520, 422, 335, 428/354, 518

[56] References Cited

U.S. PATENT DOCUMENTS

| | | |
|---|---|---|
| 3,692,727 | 9/1972 | Peschko . |
| 3,709,721 | 1/1973 | King . |
| 4,179,542 | 12/1979 | Christofas et al. . |
| 4,265,962 | 5/1981 | May . |
| 4,369,157 | 1/1983 | Conner . |
| 4,443,511 | 4/1984 | Worden et al. . |
| 4,483,900 | 11/1984 | Goldfarb . |
| 4,535,024 | 8/1985 | Parker . |
| 4,551,381 | 11/1985 | Inoue . |
| 4,555,543 | 11/1985 | Effenberger et al. . |
| 4,556,589 | 12/1985 | Neumann et al. . |
| 4,610,918 | 9/1986 | Effenberger et al. . |
| 4,654,235 | 3/1987 | Effenberger et al. . |

OTHER PUBLICATIONS

Advanced Vinyl, Inc. Product Bulletin/C29, Awncare Maintenance Products, Oct. 3, 1988.
Characteristics of Acryloid Thermoplastic Acrylic Resins, Booklet published by Marketing Services Dept., Rohm and Haas Company, Philadelphia. Pa., pp. 2-28.
DuPont Brochure, TEDLAR ®PVF Film helps keep outdoor vinyl fabrics looking newer longer. . . .
Advanced Vinyl, Inc. Brochure, Awning Covers by AVI.

Primary Examiner—P. C. Sluby
Attorney, Agent, or Firm—Bell, Seltzer, Park & Gibson

[57] ABSTRACT

The present invention provides a weatherable protective surfacing film which can be laminated to various substrates, such as vinyl outdoor fabrics, by heat and pressure without requiring adhesives. The film has a unitary structure and is comprised of an acrylic polymer/fluoropolymer composition which has a composition gradient across its thickness such that one surface of the film is fluoropolymer-rich to provide excellent weatherability, stain resistance and dirt repellant properties, while the opposite surface of the film is acrylic polymer-rich to give it self-bonding characteristics.

30 Claims, 2 Drawing Sheets

WEATHERABLE PROTECTIVE SURFACING FILM

BACKGROUND OF THE INVENTION

This invention relates to a weatherable film which is useful for forming a protective surfacing layer for a substrate. The present invention is especially applicable to the formation of a protective surface layer on flexible sheet materials, such as vinyl fabrics.

Vinyl outdoor fabrics are used in a wide range of applications such as in awnings, canopies, flexible signs, boat and pool covers, tarps and covers for trucks, and the like. Such fabrics are also widely used in constructing outdoor building structures, such as air inflated buildings and tension supported structures. In all of these outdoor applications, it is important that the vinyl fabric be able to withstand such environmental factors as extreme hot and cold temperatures, ultraviolet radiation and atmospheric pollution. The fabrics are usually produced in various colors and it is desirable that the fabric be resistant to mildew, fading by sunlight, soiling, and staining from airborne pollutants.

To maintain the appearance of the vinyl outdoor fabrics, many manufacturers recommend regular cleaning and the periodic application of a sealer composition, such as an acrylic polymer sealer. However, these procedures involve significant labor and material costs, and are therefore undesirable.

Neumann, et al. U.S. Pat. No. 4,556,589 discloses a protective fluoropolymer containing sealing layer for vinyl substrates which is applied as an aqueous dispersion to the vinyl substrate and thereafter heated and dried to provide weatherability and resistance to soiling and staining. However, coating processes such as that disclosed in the Neumann et al patent require special coating equipment with is often not available to producers of vinyl fabrics. Furthermore, such coating processes can result in uneven or incomplete coverage, pinholes or blisters, especially with fabrics having a textured surface.

Another approach which has been employed for protecting vinyl fabrics is to apply to the fabric a protective transparent film of a weatherable polymer, such as a fluoropolymer. One such commercially available film which has been widely used for this purpose is produced and sold by DuPont under the trademark Tedlar[200]. DuPont's Tedlar[200] film is an oriented polyvinyl fluoride film having excellent weatherability and stain resistance. However, the properties of this film which contribute to its excellent weatherability and stain resistance make it difficult to apply the film to a vinyl substrate. Application of the film requires a secondary process to make it adherent to the vinyl. Typically, this involves the application of solvent based adhesives. The volatile solvents required for application of the adhesive require special equipment to control the solvent vapors in the workplace environment. The natural non-adherent properties of the film also render it susceptible to delamination from the underlying vinyl substrate under severe conditions. A further significant drawback of the Tedlar[200] film in these applications is its inherent tendency to craze or stress whiten when folded. The vinyl fabrics are frequently creased or folded during handling or installation. The Tedlar[200] PVF film has a tendency to craze or stress whiten when folded, thus forming a permanent discoloration or crease line on the fabric.

It is an object of the present invention to overcome the disadvantages and limitations of the aforementioned prior art approaches to protecting vinyl fabrics.

It is a further object of the present invention to provide a film which can be applied as a protective weatherable surfacing layer for various substrates, and which does not require the use of volatile solvents or solvent based adhesives for its application.

More specifically, it is an object of the present invention to provide a protective film of the type described which can be applied to various types of substrates and which has a self-bonding capability so that it can be economically and easily applied to the substrate with the use of heat and pressure.

It is still another object of the present invention to provide a protective film of the type described which is not susceptible to crazing or stress whitening.

It is still another object of the invention to provide a film of the type described which, when applied to the substrate, forms a adherent bond which is not susceptible to delamination.

Still another object of the present invention is to provide a protective film of the type described which imparts to a substrate excellent soil and stain resistance properties.

SUMMARY OF THE INVENTION

The weatherable film of the present invention has a unitary structure and is comprised of an acrylic polymer/fluoropolymer blend which has a concentration gradient across its thickness or cross-section. Thus, one surface of the film has a greater concentration of fluoropolymer to impart weather resistant properties to the film, and an opposite surface of the film has a greater concentration of acrylic polymer to impart self-bonding properties to the film. The self-bonding surface of the film will adhere to a substrate material when heat and pressure is applied to the film.

To facilitate application of the film to a substrate, the film i provided with a releasable carrier layer which is releasably bonded to the fluoropolymer-rich side of the film so that the self-bonding acrylic polymerrich surface of the film is exposed. This composite is positioned overlying the surface of the substrate which is to be protected, and heat and pressure is applied through the carrier layer to activate the self-bonding characteristics of the film and to form a permanent bond of the film to the substrate. Then the releasable carrier layer is stripped off.

The weatherable film of this invention is especially useful for forming a protective surfacing layer on vinyl outdoor fabrics to impart weatherability, stain resistance, and soil and dirt release properties. The fabrics covered with this film tend to have self-cleaning properties with normal rainfall. The vinyl fabrics to which the weatherable film may be applied are of any conventional construction. Typically, such vinyl outdoor fabrics are produced by coating a reinforcing fabric or scrim with a vinyl composition or by laminating vinyl films to both sides of a fabric or scrim by adhesives or heat fusion.

While the weatherable film of this invention is especially useful for protecting vinyl fabrics, it can also be used to protect a variety of different types of substrates, such as plastic surfaces, metal surfaces, and the like. The film is quite useful as a protective layer on floor coverings, wall coverings, upholstery fabrics and the like.

Although the film has a different composition on its opposite surfaces, it behaves physically as a unitary homogeneous film. Once it has been transferred to the substrate, it forms a permanent surfacing layer which is not susceptible to delamination, cracking, crazing or stress whitening. Since it is applied by laminating, the surfacing film can be easily and economically applied without requiring specialized equipment such as is required for protective surface coatings. Since it does not require an adhesive or a volatile solvent, the film can be applied without requiring the handling precautions and expensive solvent containment and solvent recovery systems which are a necessary part of solvent and adhesive based systems.

A further significant advantage of the film is that it is heat sealable to itself. This facilitates forming joints and seams during fabrication. The seaming or splicing of vinyl fabrics which are protected by Tedlar[200] PVF films require that the Tedlar[200] be skived away down to the vinyl substrate and then a special Tedlar[200] tape is applied over the joint. The protective film of this invention can be heat sealed directly to itself or to a vinyl substrate.

BRIEF DESCRIPTION OF THE DRAWINGS

Some of the features and advantages of the invention having been described, others will become apparent from the detailed description which follows, and from the accompanying drawings, in which —

DETAILED DESCRIPTION OF THE PREFERRED EMBODIMENT

Figure 1:
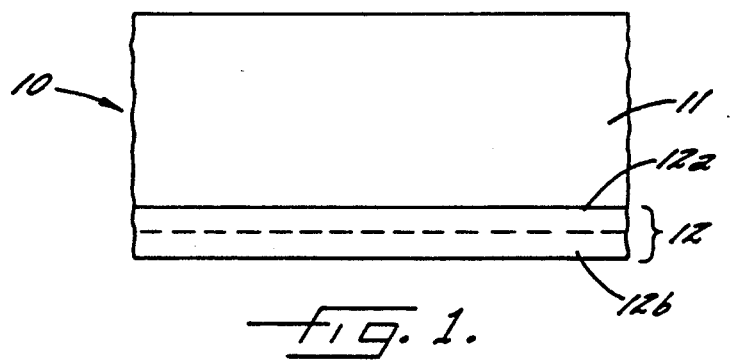
FIG. 1 is a schematic cross-sectional view illustrating the weatherable film of the present invention with its carrier layer attached thereto.

Referring now more particularly to the drawings, a strippable film transfer in accordance with the present invention is illustrated in FIG. 1. The film transfer, generally indicated by the reference character 10, includes a carrier layer or film 11 and a weatherable film 12 carried by one surface of the carrier layer 11. The carrier layer 11 may comprise a polymeric film, such as polyethylene terephthalate, polyethylene, polypropylene or the like, or may comprise a coated release paper. The weatherable film 12 is formed of an acrylic polymer/fluoropolymer blend. The broken lines within the weatherable film 12 in FIG. 1 indicate that the film is comprised of two distinct compositional zones of differing composition. Although the film 12 is of a heterogeneous composition, its appearance and its physical properties are those of a unitary, integral homogeneous film. When examined cross sectionally by microscopy under ordinary transmitted light, there is no distinct demarcation line between the two compositional zones. The interface between the two zones, if visible at all, will be seen as only a faint shadow. However, the use of cross-polarized light will reveal the presence of the more crystalline, fluoropolymer-rich zone and the more amorphous, acrylic-rich zone. Infrared spectroscopy and ultraviolet spectroscopy can also be used to identify the compositional differences at the opposite surfaces of the film.

The compositional zone closest to the carrier layer 11, which is indicated by the reference character 12a, has a greater concentration of fluoropolymer than that of the compositional zone 12b at the exposed surface of the film 12. The greater concentration of fluoropolymer gives the film 12 excellent weatherability and stain resistance. The compositional zone 12b at the exposed surface of the film 12 has a greater concentration of acrylic polymer than that of the zone 12a and thus serves to impart self-bonding properties to the film 12.

The thickness of the weatherable film 12 can be quite small to avoid undesirable stiffening the substrate to which it is applied. Preferably, the film 12 has a maximum thickness on the order of about 2 mils and most desirably the film has a thickness on the order of about ½ mil. The carrier film can be several times the thickness of the weatherable film 12, e.g. on the order of ½ to 5 mils.

Figure 2:
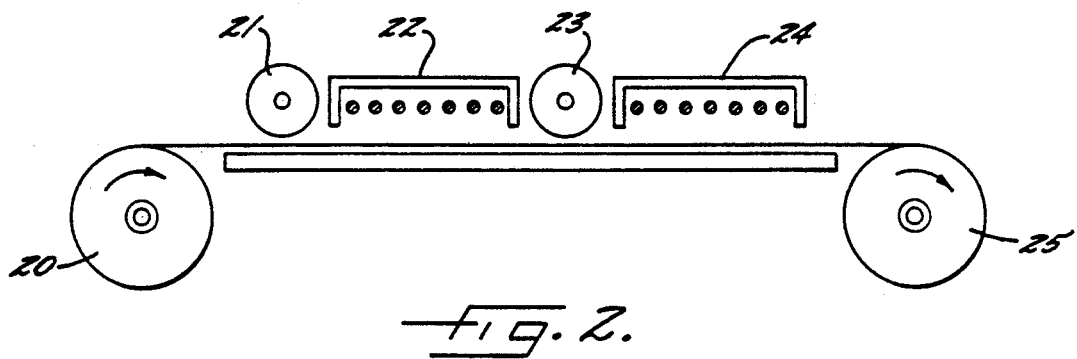
FIG. 2 is a schematic illustration of a process for producing the composite material of FIG. 1.

FIG. 2 schematically illustrates a suitable process for producing the film transfer 10. As illustrated, the carrier film 11 is unrolled from a supply roll 20 and is advanced past a series of coating stations. As it passes a first coating station 21, a thin layer of a first solvent-based polymer solution is applied to the surface of the carrier film 11. The coating station 21 may be of any suitable type, such as a printing station, a spray, a reverse roll coater or the like. The film then passes through a drying station 22, where the coating is heated by suitable means, such as heated air, to evaporate the solvent and at least partially dry the first coating composition. After emerging from the drying station 22 the carrier film is advanced past a second coating station 23 where a second coating composition is applied directly to the first coating on the carrier film 11. It is not necessary that the first coating be completely dry before application of the second coating. The film then advances from the second coating station 23 past a second drying station 24 where the film is heated to thoroughly dry the applied coatings. The film transfer 10 is then taken up on a suitable roll 25.

Figure 3:
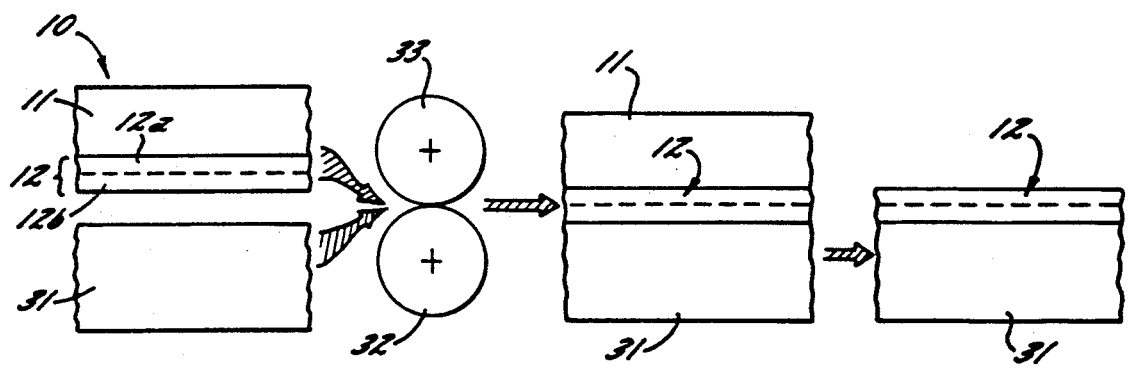
FIG. 3 is a schematic illustration showing how the protective film can be laminated to a substrate.

The weatherable film 12 of the film transfer 10 may be easily applied to a substrate by laminating with heat and pressure using readily available equipment. As shown in FIG. 3, the transfer 10 is positioned adjacent to a substrate, with the weatherable film side positioned facing the substrate and the two sheets are directed through a nip defined by a pair of cooperating rolls 32, 33. Preferably, one of the rolls 33 is a heated roll and the cooperating roll 32 has a resilient surface, such as a rubber surface. After passing between the cooperating rolls, the acrylic rich self-adhesive surface 12b of the film is firmly and permanently bonded to the upper surface of the substrate 31. The carrier material 11 may then be stripped away to leave the fluoropolymer-rich surface 12a of the film exposed on the surface of the substrate 31.

Since the protective weatherable film 12 of the invention is a liquid-cast film, it does not possess any significant degree of molecular orientation and elastic memory, in contrast to films produced by conventional melt-extrusion processes which involve stretching and orienting the film during production. Consequently, the film is relatively dimensionally stable when heated to laminate the film to a substrate. Melt-extruded molecularly oriented films, on the other hand, have an inherent elastic memory and tend to shrink when heated. The presence of the carrier layer during the laminating operation contributes to the handling properties and overall dimensional stability of the thin film transfer 10 to facilitate positioning of the protective film 12 at the desired location on the substrate surface and to assure that the relatively thin protective film 12 is arranged in a smooth wrinkle-free orientation on the substrate for lamination. The substantially molecularly unoriented liquid-cast composition of the film 12 also results in the film being relatively soft and supple so that it will easily conform to the surface contours and textures of the substrate to which the film is laminated, and will resist taking on a permanent crease when the film/substrate composite is subsequently folded or creased. By producing the film 12 from a liquid-cast process, it is possible to make the film quite thin. The film 12 can have a thickness of less than 2 mil, with a thickness of less than 1 mil being easily obtainable if desired.

The polymers which are used to form the film 12 are dissolved in suitable volatile organic solvents such as methyl ethyl ketone (MEK) or toluene. The polymer components of the first coating solution (which is used to form the fluoropolymer-rich first compositional zone 12a) include a major proportion of a fluoropolymer and a minor proportion of an acrylic polymer or copolymer which is selected so as to be compatible both with the fluoropolymer and the polymer component or components of the second acrylic-rich second compositional zone 12b. The fluoropolymer of the first zone 12a preferably comprises a vinylidene difluoride polymer or copolymer or a tetrafluoroethylene polymer or copolymer. Particularly suitable for this purpose are commercially available copolymers of tetrafluoroethylene and vinylidene. difluoride and terpolymers of tetrafluoroethylene, vinylidene difluoride and hexafluoropropylene, such as those sold by Pennwalt Corporation of Philadelphia, PA under the trademark KYNAR ™ or those sold by Imperial Chemical. Corporation under the trademark LUMIFLON ™. The acrylic polymer component preferably comprises a methylmethacrylate copolymer. The composition may also include other conventional additives, adjuvants and stabilizers, such as ultraviolet light stabilizers. To enhance the durability of the film under sunlight, it is particularly suitable to incorporate UV stabilizers such as hindered amine light stabilizers as well as UV screening agents. Dyes, pigments and/or fillers can also be included in the composition for particular purposes, such as if tint, color or opacity is desired.

The polymer components of the solution which is used to form the acrylic-rich second compositional zone 12b include a major proportion of an acrylic polymer or copolymer which is selected for its self-bonding properties to the particular substrate to which the weatherable film 12 is to be applied, and a minor proportion of a fluoropolymer which is selected for its compatibility with the fluoropolymer of the first compositional zone 12a. By appropriate selection of the acrylic copolymer component, the film can be tailored for application to various different types of substrates, including glass, metals, plastics, textile fabrics, and coated fabrics, sheets or webs. A suitable acrylic composition for many applications comprises a methylmethacrylate copolymer, such as a copolymer of methylemethacrylate and ethylmethacrylate. Particularly suitable, especially for bonding to vinyl substrates, is a 60:40 copolymer of methylmethacrylate and ethylmethacrylate. Suitable acrylic are commercially available from various sources, such a example the acrylic resins available under the trademark Acryloid from Rohm and Haas Company of Philadelphia, PA. The fluoropolymer component may comprise one or more of the above-noted copolymers used in the first compositional zone. A preferred composition for use with vinyl substrates comprises about 65% by weight acrylic copolymer and about 35% by fluoropolymer. The composition may also include other conventional additives, adjuvants and stabilizers, such as utraviolet light stabilizers, dyes, pigments and/or fillers.

The additives can be used in different amounts in the different compositional zones. For example, ultraviolet stabilizers and screeners may be used at a relatively low level up to about 1 percent by weight in the fluoropolymer rich zone 12a and at higher levels, e.g. up to about 4 percent by weight, in the acrylic rich zone 12b. Where dyes, pigments or fillers's are employed, it may be desirable to use them exclusively or in greater proportions in the acrylic rich zone 12b to maintain the highest degree of weatherability and soil and stain resistance in the fluoropolymer zone.

The following nonlimiting examples provide further illustrations and examples of the weatherable protective film of the present invention and how it is made.

EXAMPLE 1

Polymer solutions were prepared by dissolving the ingredients in solvent in the proportions indicated:

|  | Parts |
|---|---|
| Polymer Solution 1 - Fluorocopolymer-Rich First Layer | |
| Tetrafluoroethylene/vinylidene difluoride copolymer | 21.63 |
| 60:40 methylmethacrylate/ethylmethacrylate copolymer | 7.21 |
| Methyl ethyl ketone (solvent) | 70.96 |
| Hindered amine light stabilizer | 0.10 |
| UV screener | 0.10 |
| | 100.00 |
| Polymer solution 2 - Acrylic rich second layer | |
| Tetrafluoroethylene/vinylidene difluoride/ hexafluoropropylene terpolymer | 10.31 |
| 60:40 methylmethacrylate/ethylmethacrylate copolymer | 19.16 |
| Methyl ethyl ketone (solvent) | 68.17 |
| Hindered amine light stabilizer | 1.18 |
| UV screener | 1.18 |
| | 100.00 |

A clear polyethylene terephthalate film carrier layer 0.5 mil in thickness was advanced past a coating roll and a thin uniform coating of polymer solution 1 was applied. The coating was partially dried with heated air at 120° F. to form a coating thickness of about 0.25 mil. The carrier film with was then directed past a second coating roll where a thin uniform coating of polymer solution 2 was applied to the partially dired first coating for a total thickness of 0.5 mil. The film was then directed into contact with heated air at 240° F. for 30 seconds to thoroughly dry the coatings, and was thereafter rolled up.

EXAMPLE 2

A weatherable protective film as produced in Example 1 was stripped from its carrier layer and examined microscopically and by infrared surface scans. The film was clear and transparent and had a soft flexible texture and a thickness of approximately 12 μm. When a cross section of the film was examined by microscopy at 400X, only a faint shadow of a line distinguished the fluoropolymer-rich layer from the acrylic-rich layer. The fluoropolymer-rich layer was found to be approximately half as thick as the acrylic-rich layer, and possibly mingled with the acrylic rich layer at their interface. The layers were barely distinguishable without the use of cross-polarized light. Differences were detected by infrared surface scans. Both samples appear the same by infrared with the differences in the surfaces outlined below. These differences can be used to identify the presence of the composition gradient of the film.

| TYPICAL INFRARED ABSORBANCE BANDS PRESENT | |
|---|---|
| Acrylic-rich exposed self-bonding surface | Fluoropolymer-rich surface closest to carrier film |
| 830 | shifted to 840 |
| 860 | — |
| 1380 | shifted to 1400 |
| — | 1430 |
| 1450 strong | 1450 weak |

EXAMPLE 3

A film transfer as produced in Example 1 was laminated to a vinyl outdoor awning fabric by the following procedure. The transfer was positioned over the outer exposed surface of the vinyl fabric with the polyethylene terephthalate carrier layer oriented outwardly and the self-bonding acrylic-rich layer of the weatherable film facing the vinyl fabric. The two sheets were then directed through a hot nip at a temperature of 310° F. at a pressure of 50 psi. to cause the self-bonding film to fuse and bond to the vinyl fabric. The carrier layer was thereafter stripped from the surface of the vinyl fabric, leaving the protective surfacing film on the outer surface of the vinyl fabric. Flex testing of the fabric showed excellent adhesion with no tendency to delamination.

EXAMPLE 4

A film transfer was prepared by the procedure described in Example 1 from the following polymer solutions:

| | Parts |
|---|---|
| Polymer solution 1 - Fluorocopolymer-rich first layer | |
| Tetrafluoroethylene/vinylidene difluoride copolymer | 21.63 |
| Methyl methacrylate polymer ($T_g = 100°$ C.) | 7.21 |
| Methyl ethyl ketone (solvent) | 70.96 |
| Hindered amine light stabilizer | 0.10 |
| UV screener | 0.10 |
| | 100.00 |
| Polymer solution 2 - Acrylic rich second layer | |
| Tetrafluoroethylene/vinylidene difluoride copolymer | 8.79 |
| Methylmethacrylate copolymer ($T_g = 35°$ C.) | 20.51 |
| Methyl ethyl ketone (solvent) | 68.36 |
| Hindered amine light stabilizer | 1.17 |
| UV screener | 1.17 |
| | 100.00 |

EXAMPLE 5

A vinyl film was produced by casting a vinyl organosol onto a smooth polyethylene terephthalate (Mylar) casting sheet, followed by heating to fuse the organosol. This vinyl film was laminated to a release layer coated with a pressure sensitive adhesive, and the casting base was stripped off to expose the smooth glossy surface of the vinyl film. This surface of the vinyl film was nipped to the exposed acrylic-rich surface of a film transfer as produced as in Example 1 under heat and pressure to bond the two films together. Then the carrier layer was stripped from the laminate, resulting in a vinyl film/fluoropolymer laminate having a very smooth, glossy, high DOI (distinctness of image) surface which was weatherable and highly stain and soil resistant.

Figure 4:
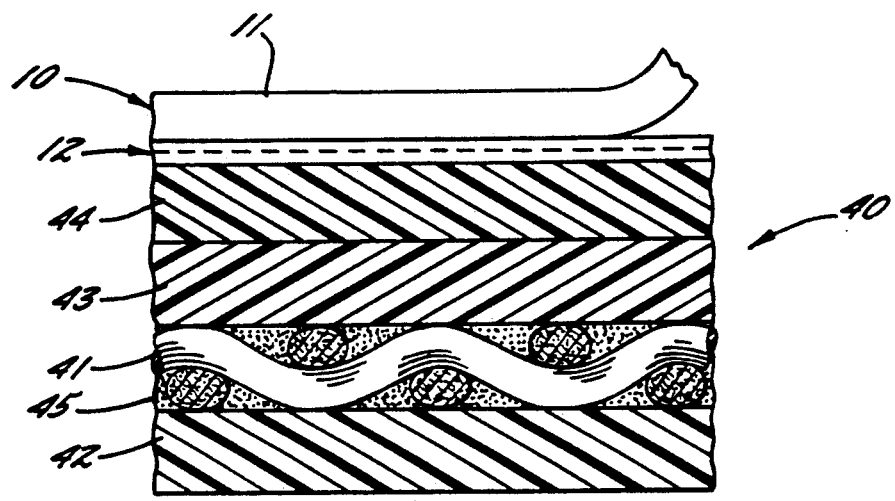
FIG. 4 is a schematic cross-sectional view illustrating the protective film/carrier film composite of this invention applied to the surface of a vinyl laminated fabric.

FIG. 4 illustrates the application of the film transfer 10 to a vinyl fabric 40 of conventional construction. As illustrated, the vinyl fabric includes a reinforcing scrim layer 41 which is formed for example of woven polyethylene terephthalate yarns. Adhered to the rear surface of the scrim layer 41 by an adhesive 45 is a backing layer 42 formed of polyvinyl chloride. Adhered to the opposite surface of the scrim 41 by adhesive 45 is another film 43 of polyvinyl chloride, and in the illustrated construction still another layer 44 of polyvinyl chloride film is adhered to the film layer 43. Vinyl fabrics of this type are well known in the art and are typically produced by either laminating or coating the vinyl layers to the scrim substrate layer.

The weatherable film transfer 10 is applied to the exposed front surface 44 of the vinyl fabric 40 by laminating with heat and pressure in the manner previously described, and then the carrier layer 11 is stripped away.

Figure 5:
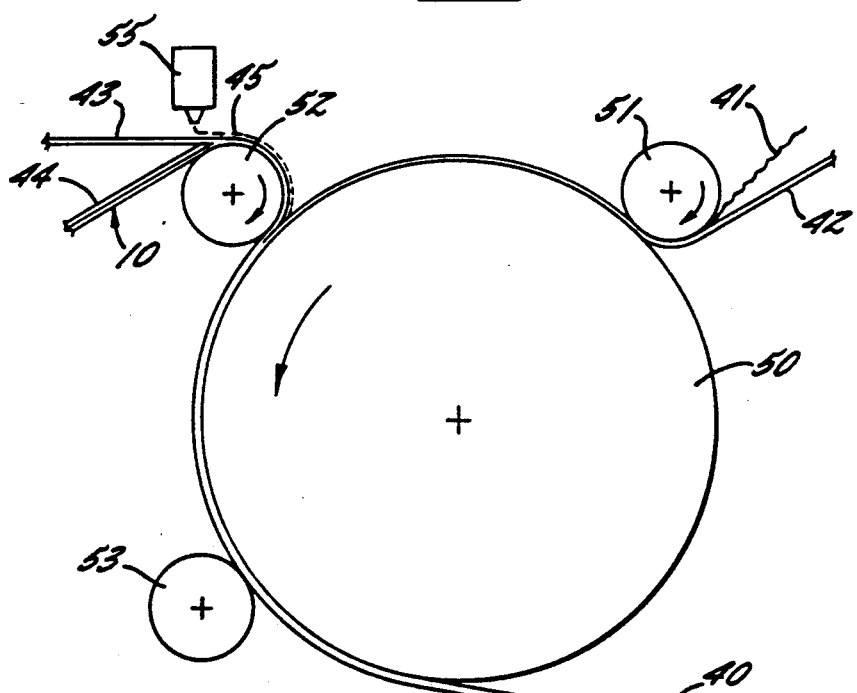
FIG. 5 is a schematic illustration of process for producing a vinyl laminated fabric while applying the protective weatherable film of the present invention.

FIG. 5 illustrates a suitable apparatus for forming a vinyl fabric 40 of the type shown in FIG. 4. As illustrated, the apparatus includes a laminating drum 50 with a series of rolls 51, 52, 53, and 54 at spaced locations thereabout. A first vinyl layer 42 which forms the rear of the fabric composite is directed over roll 51 and onto the surface of the drum 50. A fabric scrim 41 is also directed over roll 51 and onto the surface of the laminating drum 50. An inner vinyl layer 43, typically of a colored pigmented polymer, is then directed past an adhesive applying station 55 where an adhesive layer 45 is applied. The adhesive coated vinyl layer is directed over roll 52 and is combined with the substrate to form a laminate. In a separate operation, an outermost clear vinyl layer 44 is combined with the protective film transfer 10 of the present invention by passing through a nip in a manner similar to that shown in FIG. 3. The vinyl film 44 and transfer film 10 composite are directed over roll 52 and into contact with the other layers where they are thereafter laminated together to form the vinyl composite product. In a subsequent operation, the carrier layer can be stripped from the outer surface of the vinyl fabric to leave the protective outer film 12 exposed on the outer surface.

That which we claim is:

1. A weatherable film for forming a protective surfacing layer for a substrate, said film comprised of a blend of an acrylic polymer and a fluoropolymer, and having a unitary structure with a concentration gradient through its cross-section such that one surface of the film has a greater concentration of fluoropolymer than the opposite surface thereof to impart weather-resistant properties to the film and said opposite surface has a greater concentration of acrylic polymer than said one surface to impart self-bonding properties to the film.

9

2. A film according to claim 1, wherein said film is formed of a substantially molecularly unoriented solution-cast polymer.

3. A film according to claim 1 wherein the thickness of said unitary film is no more than about 2 mils.

4. A film according to claim 1 wherein said fluoropolymer comprises a tetrafluoroethylene copolymer and said acrylic polymer comprises a methylmethacrylate copolymer.

5. A film transfer comprising a sheet of release material releasably adhered to said one surface of the weatherable film according to claim 1.

6. A composite material having a weatherable surface and comprising the film according to claim 1, with said opposite surface thereof being bonded to said substrate.

7. A weatherable film for forming a weatherable protective surfacing layer for a substrate, said film comprised of a blend of an acrylic polymer and a fluoropolymer, and having a unitary structure with a concentration gradient through its cross-section such that there is a fluoropolymer-rich first compositional zone at one surface of the film and an acrylic-rich second compositional zone at the opposite surface of said film, said fluoropolymer serving to impart weather-resistant properties to said one surface of the film and said acrylic polymer serving to impart self-bonding properties to said opposite surface of the film.

8. A film according to claim 7 wherein said fluoropolymer in said first compositional zone comprises a copolymer of vinylidene fluoride and tetrafluoroethylene.

9. A film according to claim 7 wherein said fluoropolymer in said second compositional zone comprises a terpolymer of vinylidene fluoride, tetrafluoroethylene and hexafluoro-propylene.

10. A film according to claim 7 wherein said first compositional zone comprises about 75% by weight fluoropolymer and about 25% by weight acrylic polymer.

11. A film according to claim 7 wherein said second compositional zone comprises about 65% by weight acrylic polymer and about 35% by weight fluoropolymer.

12. A film according to claim 7 wherein said first compositional zone further comprises up to about 1% by weight of ultraviolet light stabilizers.

13. A film according to claim 7 wherein said second compositional zone further comprises up to about 4% by weight of ultraviolet stabilizers.

14. A film according to claim 7 wherein said acrylic polymer composition in said first compositional zone comprises a copolymer of methylmethacrylate and ethylmethacrylate.

15. A film according to claim 7 wherein said acrylic polymer composition in said second compositional zone comprises a copolymer of methylmethacrylate and ethylmethacrylate.

16. A film transfer for forming a weatherable protective surfacing layer for a substrate, comprising a carrier layer and a weatherable protective film bonded to said carrier layer, said weatherable protective film having a unitary structure comprised of an acrylic polymer/fluoropolymer composition and having a composition gradient across its thickness such that one surface of the film has a greater concentration of said fluoropolymer to impart weather-resistant properties to the film and the opposite surface has a greater concentration of said acrylic polymer to impart self-bonding properties to the film, and wherein said one surface of the film having a greater concentration of fluoropolymer is releasably bonded to said carrier layer so that said self-bonding opposite surface of the film is exposed, whereby the self-bonding surface of the film may be applied to a substrate and said carrier layer subsequently removed.

17. A composite sheet material comprising a substrate and a protective film overlying and bonded to at least one surface of said substrate, said protective film comprised of a blend of an acrylic polymer and fluoropolymer, and having a unitary structure with a concentration gradient through its cross-section such that the exposed outer surface of the film has a greater concentration of said fluoropolymer than the opposite surface of the film to impart weather-resistant properties to the film and said opposite surface of the film which is bonded to said substrate, has a greater concentration of said acrylic polymer to bond the film to said surface of said substrate.

18. The composite material according to claim 17 wherein said substrate comprises a flexible sheet material permanently bonded to said opposite surface of said film with said film forming a weatherable protective surface for the flexible sheet material.

19. The composite material according to claim 18 wherein said flexible sheet material comprises a vinyl covered textile fabric.

20. The composite material according to claim 17 wherein said substrate comprises a metal surface.

21. The composite material according to claim 17 wherein said substrate comprises a plastic surface.

22. The composite material according to claim 17, wherein said film comprises a substantially molecularly unoriented solution-cast film.

23. The composite material according to claim 17 wherein said unitary film has a thickness of no more than about 2 mils.

24. The composite material according to claim 17 wherein said fluoropolymer comprises a tetrafluoroethylene copolymer and said acrylic polymer comprises a methylmethacrylate copolymer.

25. A composite sheet material comprising a flexible fabric substrate including a textile reinforcing fabric and at least one layer of polyvinyl chloride overlying each surface of said reinforcing fabric and a protective film overlying and bonded to at least one surface of said flexible fabric substrate, said protective film comprised of a blend of an acrylic polymer and a fluoropolymer, and having a unitary structure with a concentration gradient through its cross-section such that the exposed outer surface of the film has a greater concentration of said fluoropolymer than the opposite surface of the film to impart weather-resistant properties tot eh film and said opposite surface of the film which is bonded to said substrate, has a greater concentration of said acrylic polymer to bond the film to said surface of said flexible fabric substrate.

26. A weatherable film for forming a weatherable protective surfacing layer for a substrate, said film comprised of a blend of a methylmethacrtylate copolymer and a vinylidene fluoride copolymer, and having a unitary structure with a concentration gradient through its cross-section such that there is a vinylidene fluoride-rich first compostional zone at one surface of the film and a methylmethacrylate-rich second compositional zone at the opposite surface of said film, said vinylidene fluoride copolymer serving to impart weather-resistant properties to said one surface of the film and said methylmethacrylate copolymer serving to impart self-bonding properties to said opposite surface of the film.

27. A film according to claim 26 wherein said vinylidene fluoride copolymer comprises a copolymer of vinylidene fluoride and tetrafluoroethylene and wherein said methylmethacrylate copolymer comprises a copolymer of methylemthacrylate and ethylmethacrylate.

28. A film according to claim 26 wherein said film additionally includes ultraviolet light stabilizers.

29. A composite sheet material comprising a flexible fabric substrate including a textile reinforcing fabric and at least one layer of polyvinyl chloride overlying each surface of said reinforcing fabric, and a protective film overlying and bonded to at least one surface of said flexible fabric substrate, said protective film comprised of a blend of a methylmethacrylate copolymer and a vinylidene fluoride copolymer, and having a unitary structure with a concentration gradient through its cross-section such that there is a vinylidene fluoride copolymer-rich compostitional zone on an exposed outer surface of the film and a methylmethacrylate copolymer-rich compositional zone on an opposite surface of said film which surface is bonded to said flexible fabric substrate.

30. A composition sheet material according to claim 29 wherein said first compositional zone comprises a copolymer of vinylidene fluoride and tetrafluoroethylene and wherein said vinylidene fluoride copolymer in said second compositional zone comprises a terpolymer of vinylidene fluoride, tetrafluoroethylene and hexafluoropropylene.

* * * * *

UNITED STATES PATENT AND TRADEMARK OFFICE
CERTIFICATE OF CORRECTION

PATENT NO. : 5,108,836
DATED : April 28, 1992
INVENTOR(S) : Don O. OCampo, et al It is certified that error appears in the above-indentified patent and that said Letters Patent is hereby corrected as shown below:

Column 1, line 50, (both occurrences) "Tedlar$^{200}$" should be -- Tedlar® --.

Column 1, line 64, "Tedlar$^{200}$" should be -- Tedlar® --.

Column 1, line 67, "Tedlar$^{200}$" should be -- Tedlar® --.

Column 2, line 43, "i" should be -- is --.

Column 2, line 45, "polymerrich" should be -- polymer-rich --.

Column 3, line 20, "Tedlar$^{200}$" should be -- Tedlar® --.

Column 3, line 21, "Tedlar$^{200}$" should be -- Tedlar® --.

Column 3, line 22, "Tedlar$^{200}$" should be -- Tedlar® --.

Column 6, line 4, after "acrylic" insert -- resins --.

Column 6, line 5, "a" should be -- as for --.

Column 9, line 35, "hexafluoro-propylene" should be -- hexafluoropropylene --.

Column 10, line 16, after "film" (second occurrence) insert -- , --.

Column 10, line 53, "tot eh" should be -- to the --.

UNITED STATES PATENT AND TRADEMARK OFFICE
CERTIFICATE OF CORRECTION

PATENT NO. : 5,108,836
DATED : April 28, 1992
INVENTOR(S) : Don O. OCampo et al

It is certified that error appears in the above-indentified patent and that said Letters Patent is hereby corrected as shown below:

Column 10, line 54, after "film" insert -- , --.

Column 10, line 60, "methylmethacrtylate" should be -- methylmethacrylate --.

Column 10, lines 66 and 67, "vinyulidene" should be -- vinylidene --.

Column 11, line 8, "methylemthacrylate" should be -- methylmethacrylate --.

Column 12, line 8, after "film" insert -- , --.

Signed and Sealed this

Fourteenth Day of December, 1993

Attest:

BRUCE LEHMAN

*Attesting Officer*    Commissioner of Patents and Trademarks